US006338271B1

(12) United States Patent
Stark

(10) Patent No.: US 6,338,271 B1
(45) Date of Patent: Jan. 15, 2002

(54) DEVICE AND PROCESS FOR MEASURING THE VELOCITY OF FLOW OF A FLUID

(75) Inventor: Hartmut Stark, Stockelsdorf (DE)

(73) Assignee: Dräger Aktiengesellschaft (DE)

( * ) Notice: Subject to any disclaimer, the term of this patent is extended or adjusted under 35 U.S.C. 154(b) by 0 days.

(21) Appl. No.: 09/391,435

(22) Filed: Sep. 8, 1999

(30) Foreign Application Priority Data

Mar. 4, 1999 (DE) .......................................... 199 09 469

(51) Int. Cl.[7] ................................................ G01F 1/68
(52) U.S. Cl. ...................................... 73/204.24; 374/54
(58) Field of Search ........................ 73/204.24, 204.11; 374/147, 148, 54, 179; 338/13, 22 R, 25

(56) References Cited

U.S. PATENT DOCUMENTS

| 3,691,833 A | * | 9/1972 | Fujikake et al. ............... 73/204 |
| 3,742,761 A | * | 7/1973 | Randall ........................ 73/204 |
| 5,677,484 A | * | 10/1997 | Stark ....................... 73/204.24 |

FOREIGN PATENT DOCUMENTS

EP 0 187 723 A2 7/1986

* cited by examiner

Primary Examiner—Benjamin R. Fuller
Assistant Examiner—Corey D. Mack
(74) Attorney, Agent, or Firm—McGlew and Tuttle, P.C.

(57) ABSTRACT

A device for measuring the velocity of flow of a fluid, with at least one thermocouple (10), whose junction point is arranged in the fluid, with an a.c. power source (11) heating the thermocouple to a working temperature higher than the temperature of the fluid and with an evaluating circuit (12, 13) processing the thermocouple voltage, is to be improved such that the temperature dependence of the heat conductivity of the fluid to be investigated is compensated in a simple manner. To accomplish this object, the temperature coefficient of the ohmic resistance of the thermocouple (10) is adapted to the temperature dependence of the heat conductivity of the fluid such that the heating power converted in the thermocouple (10) during a change in temperature and unchanged current varies by exactly the same amount as the amount of heat released to the fluid due to the changed heat conduction.

10 Claims, 2 Drawing Sheets

DEVICE AND PROCESS FOR MEASURING THE VELOCITY OF FLOW OF A FLUID

FIELD OF THE INVENTION

The present invention pertains to a device for measuring the velocity of flow of a fluid with at least one thermocouple with a junction point arranged in the fluid, with an a.c. power source heating the thermocouple to an increased working temperature compared with the temperature of the fluid and with an evaluating circuit processing the thermocouple voltage. The present invention also pertains to a process for measuring the velocity of flow of a fluid with a thermocouple.

BACKGROUND OF THE INVENTION

A suitable measuring method for measuring the velocity of flow of a fluid is, e.g., the hot wire anemometry, which is based on measuring the amount of heat released from a heating element to the fluid to be investigated. The velocity of flow can be inferred by taking this variable into account with the temperature difference prevailing between the heating element and the fluid.

The arrangements used for this type of measurement usually determine the temperature difference by the separate measurement of the temperature values for the heating element and the fluid and taking them mutually into account by means of the downstream electronic unit, which leads to problems due to the lead-in and contact resistances because of the further processing of the measured signal being separated in space. Since the lead-in and contact resistances of the plug contacts also affect the measured value proper at the time of the measurement of the hot wire resistances of interest, depending on the measuring circuit, the measurement may be interfered with by changes in the arrangement of the wiring. The substraction also increases the relative error in the signal difference compared with the initial variables, because the measurement of the individual resistance results in an absolute error that is not eliminated during the subtraction, while the measured signal decreases at the same time. The quotient of the absolute error to the measured value, i.e., the relative error, is increased as a result.

However, it is advantageous in this principle of measurement for the temperature of the fluid to be known. Any temperature-related drifts of the fluid parameters, e.g., the heat conductivity, can thus be compensated at least partially. The change in temperature is measured for this purpose in order to infer the change in the signal caused by parameter drift and to correct this change by taking the measured value into account.

However, arrangements have also been known in which temperature differences are measured directly at the site of the measurement. This may be done, e.g., by the hot wire located in the fluid to be investigated not having been made of a homogeneous wire material but of a series of at least two partial wires consisting of different materials, which are connected to one another at their junction point in an electrically conducting manner, e.g., by soldering or welding. A thermocouple is thus formed at the junction point of the wires, while another heat transition is formed at the transitions between the hot wire and the support element. Such a device has become known from EP 0 187 723 A2. The thermocouple voltage delivered by this device is a direct indicator of the temperature difference between the hot wire and the environment, which is gaseous in this case, if it is ensured by design measures that the area of the support elements is at ambient temperature. If this temperature difference is maintained at a constant value by control technology by adjusting the heating power, the device may be used optionally for measuring the velocity of flow or the heat conductivity of the surrounding medium if the respective other parameter is known.

Problems are caused by the fact that the heat conductivity of gases depends on the temperature and increases with increasing temperature. This means that a measuring device of the type described, which only maintains the temperature difference between the measuring wire and the fluid at a constant value and evaluates the heating power needed for this as a measured variable, also detects these temperature drifts as an apparent measured signal. The consequence of an increasing fluid temperature is that the heat conductivity will increase as well and it brings about increased heat dissipation from the hot wire, which would reduce its excess temperature relative to the fluid without control. The additional heating power that is needed to bring the excess temperature of the wire relative to the fluid to the old difference set point now mimics a change in the measured value of the velocity of flow, from which a corresponding drift of the measured signal results.

SUMMARY AND OBJECTS OF THE INVENTION

The primary object of the present invention is to improve a device of the type described such that the temperature dependence of the heat conductivity of the fluid to be investigated will be compensated in a simple manner.

According to the invention, a device for measuring the velocity of flow of a fluid is provided with at least one thermocouple. The thermocouple has a junction point arranged in the fluid, with an a.c. power source heating the thermocouple to an increased working temperature compared with the temperature of the fluid. An evaluating circuit processes the thermocouple voltage. The temperature coefficient of the ohmic resistance of the thermocouple is adapted to the temperature dependence of the heat conductivity of the fluid such that the heating power converted in the thermocouple during a change in temperature and unchanged a.c. current varies by exactly the same amount as the amount of heat released to the fluid due to the changed heat conduction.

According to another aspect of the invention, a process for measuring the velocity of flow of a fluid with a thermocouple is provided with a junction point arranged in the fluid and heated with the a.c. power source to a working temperature that is increased compared with the fluid temperature. The temperature coefficient of the ohmic resistance of the thermocouple is adapted to the temperature dependence of the heat conductivity of the fluid such that the heating power converted in the thermocouple in the case of a change in temperature and unchanged a.c. current varies by exactly the same amount as the amount of heat released to the fluid due to the changed heat conduction. Corresponding conditions prevail in the case of a decrease in temperature.

Even though the selection of materials is already limited due to the necessity to use thermocouple wires for the heating element, the temperature characteristic of the ohmic resistance of the thermocouple can be affected by a number of parameters so that various design possibilities may be considered for the required adaptation of the temperature coefficient. Helpful is the fact that even though the two partial wires of the thermocouple possess different physical properties, such as resistivity, temperature coefficient and heat conductivity, the properties pass over into each other in the area of the junction point. A fine tuning may therefore already be achieved by varying the geometric conditions, without the need to use novel wire alloys. This may be done in this case by welding together partial wire sections of different thickness.

Another advantageous embodiment is based on the use of a continuous carrier, to which the thermoelectrically active materials may be applied as desired in a layer thickness that can be freely determined. The effect of the physical properties of the individual materials on the behavior of the thermocouple can thus be set within a broad range. Besides the use of insulating materials, such as glass fibers, especially the use of a continuous metal wire as a carrier is conceivable.

Also advantageous is a structure in which a hot wire, whose temperature coefficient is optimally adapted to the fluid, is provided with an insulating intermediate layer to subsequently apply to the latter the thermoelectrically active layers needed for the temperature measurement by vapor deposition.

The mode of action of the temperature compensation proposed according to the present invention will be explained on the basis of a numerical example.

If a short area of the wire of a length of 1 mm around the junction point of the thermocouple is considered, cylindrical propagation of heat and uniform wire temperature may be assumed.

The heat conductivity of the fluid also changes in the case of a change in the fluid temperature. The change in the heat conduction is largely linear for most of the gases of interest in the temperature range between 0° C. and 200° C. Thus, the change in the heat conductivity for nitrogen and oxygen is about 10% in the case of a temperature jump from 20° C. to 70° C. In the case without flow, this corresponds to a change in the heat demand of the thermocouple by about 0.3 mW per mm of wire length.

It is proposed according to the present invention that the temperature coefficient of the ohmic resistance of the thermocouple be selected to be such that it corresponds to the temperature dependence of the heat conductivity of the fluid to be investigated. Since the electric power to be supplied is proportional to the ohmic resistance of the thermocouple at constant current, an increase in the ohmic resistance brings about an increase in the electric power by the same factor. As a result, the change in the heat dissipation caused by the changed heat conductivity of the fluid is just compensated.

The fact that the change in resistance by 4.17% needed for optimal compensation differs from an approximately 10% change in heat conductivity can be attributed to the fact that the heat balance of the wire is composed of a plurality of different components. Besides effects of secondary importance, such as convection and infrared radiation, the heat conduction in the hot wire brings about a rather substantial heat loss via the wire supports, so that the amount of heat released into the fluid is only about 40% of the overall heat demand in the case without flow. This means that the change in the heating power brought about by the resistance is related to a lower basic value, which leads to the necessary greater relative changes in the amount of heat released into the fluid.

Since the ratio of the two components is shifted in favor of the component related to the fluid in the case with flow, the compensating effect decreases with increasing velocity of flow. This means for practice that the constant heat conduction component in the wire is maintained at the lowest possible value by corresponding dimensioning (thin wire) in order for the compensation to act in the entire range of flow. In the specific case, the dimensioning is optimized for minimal zero point drift.

Since the hot wire is composed of two different wire materials with different temperature coefficients in the area of the junction point in a thermocouple sensor, and these materials also have different heat conduction values, an expression composed of two partial resistances is obtained for the temperature dependence of the wire resistance:

$$R=\rho_1*l_1(1+\alpha_1\theta)/A_1+\rho_2*l_2(1+\alpha_2\theta)/A_2 \quad (1)$$

| in which $\rho_{1,2}$ = resistivity | $l_{1,2}$ = partial wire lengths |
|---|---|
| $A_{1,2}$ = wire cross sections | $\alpha_{1,2}$ = temperature coefficient |
| $\theta$ = wire temperature | |

If the examination is limited to the narrow area around the junction point, in which an ideal heat exchange and uniform temperature can be assumed ($l_1=l_2=0.5$ mm), the increase in power brought about by the change in resistance must correspond to the increased power demand caused by the change in the heat conduction by the fluid for an ideal compensation in the area of the wire. If 120° C. is introduced as the wire temperature $\theta$ in Equation (1) at a measured current I of 160 mA, $$P_{120}=I^2*R=7.19 \text{ mW}$$

is obtained for $\rho_1=0.706\,\mu\Omega$, $\rho_2=0.315\,\mu\Omega$, $\alpha_1=0.00032\,\text{K}^{-1}$, $\alpha_2=0.019\,\text{K}^{-1}$ and $A_1=A_2=1.96*10^{-9}\,\text{m}^2$.

For the specific case, this means that the composite resistance must change by $$\frac{\Delta R}{R}=\frac{\Delta P}{P_{120}}=\frac{0.3 \text{ mW}}{7.19 \text{ mW}}=4.17\%.$$

For the general solution, the temperature-dependent components of the partial wire resistances must be separated from the temperature-independent components:

$$\frac{\Delta R}{R}=\frac{\theta(\rho_1*\alpha_1*l_1/A_1+\rho_2\alpha_2l_2/A_2)}{\rho_1*l_1/A_1+\rho_2l_2/A_2}. \quad (2)$$

Equation (2) incorporates the possibilities of affecting the compensation by varying the wire geometry, i.e., by varying the wire cross sections $A_1$, $A_2$ or the wire length $l_1$, $l_2$ as well as by selecting the material, and it must be borne in mind that a change in the wire diameter also affects the heat balance. Optimal sensor properties were obtained in the specific case by the use of a combination of chromel Ni 90 Cr 10 and alumel wires Ni 95/Al+Mn+Si 5 with a diameter of 50 $\mu$m and a length of 2.5 mm each. These were connected to one another by resistance welding and were welded onto two gold-plated support pins with a thickness of 0.8 mm. The material data are as follows: $\rho_{chromel}=0.706\,\mu\Omega$, $\rho_{alumel}=0.315\,\mu\Omega$, $\alpha_{chromel}=0.00032\,\text{K}^{-1}$, $\alpha_{alumel}=0.019\,\text{K}^{-1}$, $\lambda_{chromel}=19\,\text{Wm}^{-1}\,\text{K}^{-1}$, $\lambda_{alumel}=31\,\text{Wm}^{-1}\,\text{K}^{-1}$.

$$\frac{\Delta R}{R}=4.04\% \text{ is obtained with these values.}$$

More than 90% of the temperature drift caused by a change in the heat conduction by the gas is thus compensated.

One exemplary embodiment of the present invention is shown in the figure and will be explained in greater detail below.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
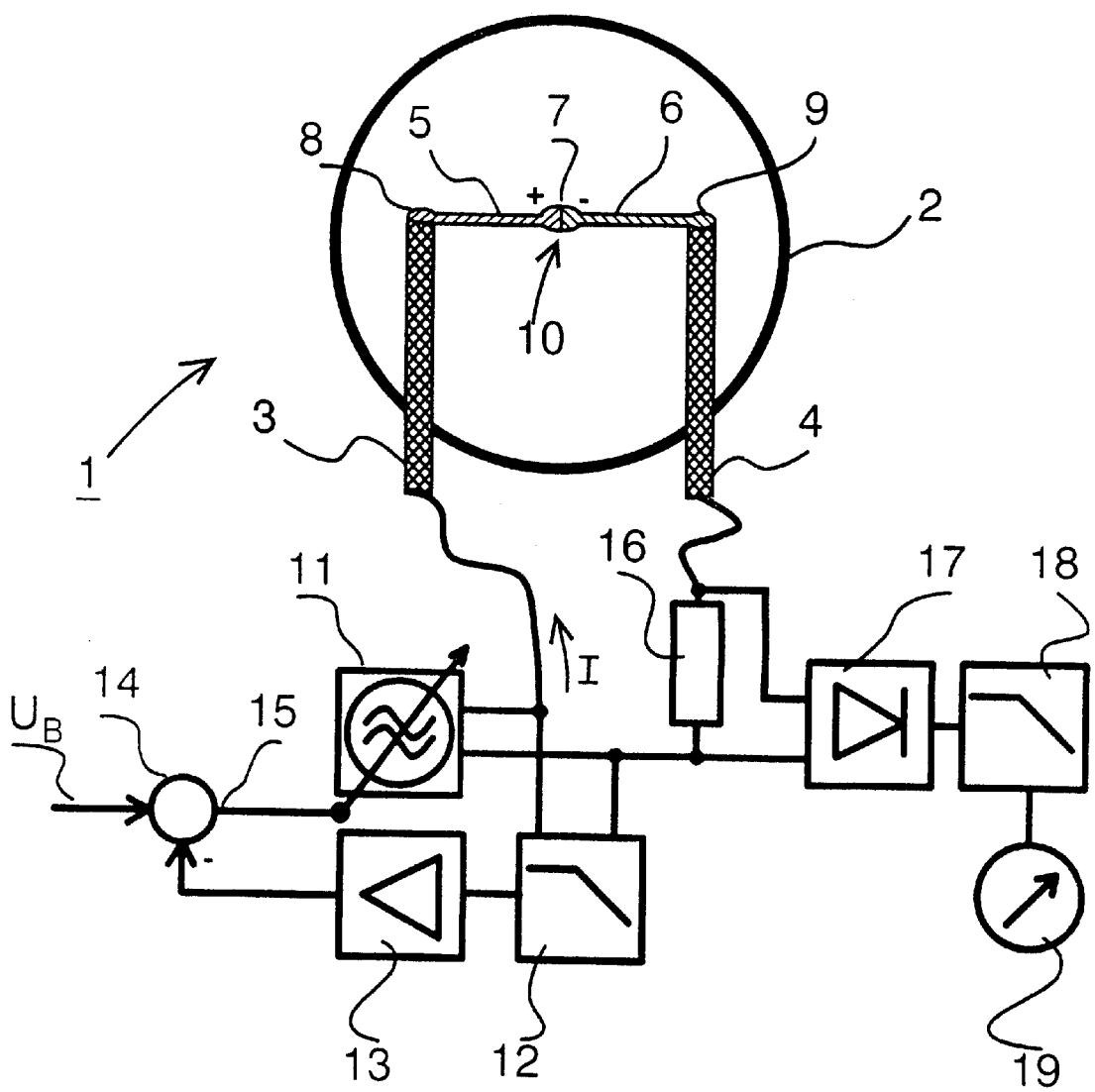
FIG. 1 is a view showing a device for measuring the velocity of flow with a thermocouple.

FIG. 1 schematically shows a measuring device 1 for determining the velocity of flow of a gas mixture consisting of oxygen and nitrogen, which is present in a measuring channel 2. A first partial wire 5 consisting of chromel and a second partial wire 6 consisting of alumel are fastened to two support wires 3, 4, which extend into the measuring channel 2, and they are joined at a first junction point 7. The partial wires 5, 6 together form a thermocouple 10. A second junction point 8 is located between the first partial wire 5 and a first support wire 3 and a third junction point 9 is located between the partial wire 6 and a second support wire 4. The support wires 3, 4 consist of gold-plated Ni—Fe—Co with a material thickness of 0.8 mm. The partial wires 5, 6 have a thickness of 50 $\mu$m and a length of 2.5 mm each. The junction points 7, 8, 9 were prepared by resistance welding. Due to the marked difference in the material thicknesses of the support wires 3, 4 and the partial wires 5, 6, the junction points 8, 9 are at the temperature level of the gas mixture to be investigated in the measuring channel 2, while the first junction point 7 is heated by means of an a.c. power source 11 to a working temperature that is increased compared with the temperature of the gas mixture. The a.c. power source 11 delivers a supply current I for this. In this wiring of the thermocouple 10, an a.c. voltage signal, to which a d.c. voltage caused by the inherent EMC of the thermocouple 10, hereinafter called the thermocouple voltage, is superimposed, is present on the support wires 3, 4. The thermocouple voltage is filtered out of the a.c. voltage signal by means of a low-pass filter 12, raised to a higher signal level with an amplifier 13 and is compared with a reference voltage $U_B$ in a subtraction element 14. The reference voltage $U_B$ as a temperature set point is proportional to the working temperature of the thermocouple 10. The difference signal formed from the amplified thermocouple voltage and the reference voltage $U_B$ at the output 15 of the subtraction element 14 is sent as a manipulated variable to the a.c. power source 11. The thermocouple 10, the low-pass filter 12, the amplifier 13, the subtraction element 14 and the a.c. power source 11 together form a temperature control circuit of the thermocouple 10, and the thermocouple voltage reflects the actual value of the temperature. The circuit section of the support wire 4 contains a measuring resistor 16, at which a voltage drop proportional to the supply current I is formed. This a.c. voltage drop is rectified with a diode 17 and is sent to a display instrument 19 via a smoothing means 18.

In the case of flow through the measuring channel 2, the thermocouple 10 cools, so that the supply current I is adjusted in order to bring the thermocouple 10 again to the original working temperature. The change in the supply current I depends on the velocity of flow of the gas mixture. The partial wires 5, 6 of the thermocouple 10 are dimensioned such that the temperature coefficient of the ohmic resistance of the thermocouple 10 corresponds to the temperature dependence of the heat conductivity of the nitrogen-oxygen gas mixture to be investigated. A change in the temperature of the gas mixture will then bring about such a change in the heating power converted in the thermocouple that the disturbances caused by the changed heat conductivity of the gas mixture in the heat supply of the thermocouple 10 will be just compensated.

Figure 2:
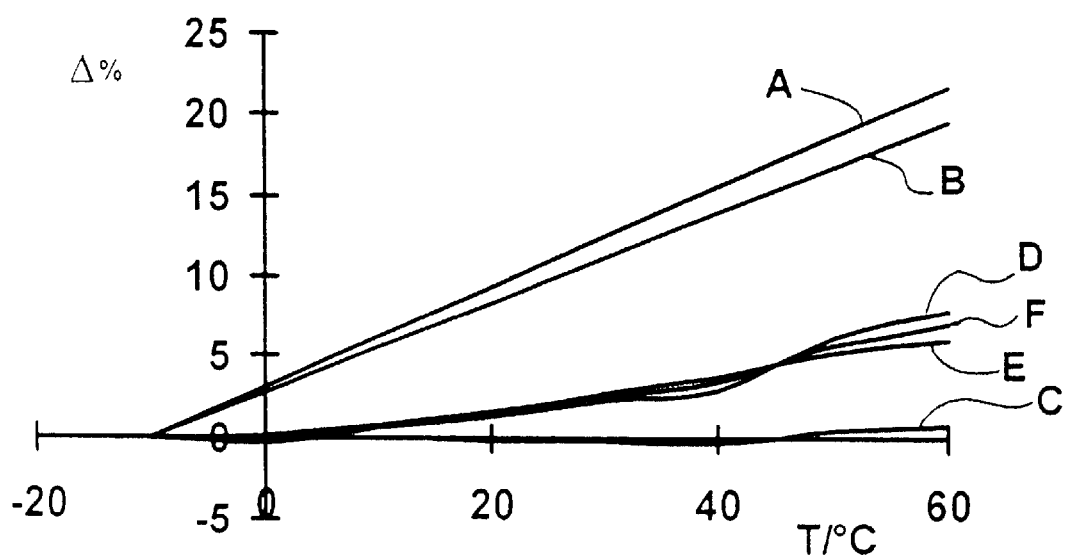
FIG. 2 is a view showing the temperature dependence of the heat conductivity of a fluid to be investigated and the corresponding temperature dependence of the ohmic resistance of the thermocouple.

FIG. 2 illustrates an example of some of the results obtained with the first measuring device 1. The temperature T in degrees Celsius is shown on the abscissa and the relative deviations $\Delta$ for the heat conductivity $\lambda$, the supply current I, the electric power, the ohmic resistance of the thermocouple 10, and the heating voltage in percent are shown on the ordinate.

Curve A shows the temperature dependence of the heat conductivity $\lambda$ for oxygen and curve B shows the corresponding curve for nitrogen. Curve C shows the curve of the supply current I supplied by the a.c. power source 11, which is essentially constant.

Curves D, E, F, which lie almost one on top of another, show the corresponding relative changes in the electric power, in the ohmic resistance of the thermocouple 10 and in the heating voltage. Nearly complete compensation of the temperature dependence of the heat conduction of the nitrogen-oxygen gas mixture is achieved due to the dimensioning of the thermocouple 10 proposed according to the present invention.

While a specific embodiment of the invention has been shown and described in detail to illustrate the application of the principles of the invention, it will be understood that the invention may be embodied otherwise without departing from such principles.

What is claimed is:

1. A device for measuring the velocity of flow of a fluid, the device comprising:

a thermocouple with a junction point arranged in the fluid;

an a.c. power source connected to the thermocouple and passing current through said thermocouple for heating the thermocouple to an increased working temperature compared with the temperature of the fluid, said thermocouple generating a thermocouple voltage representative of said working temperature;

an evaluating circuit processing said thermocouple voltage, said thermocouple having a temperature coefficient of its ohmic resistance adapted to a temperature dependence of the heat conductivity of the fluid such that a heating power converted in said thermocouple during a change in ambient fluid temperature and unchanged said a.c. current varies by exactly the same amount as the amount of heat released to the fluid due to changed heat conduction, said evaluation circuit measuring the current to determine the velocity of the flow.

2. The device in accordance with claim 1, wherein said thermocouple has a first partial wire and a second partial wire with a material thickness between 10 $\mu$m and 200 $\mu$m and that a length of each of said first partial wire and said second partial wire is between 1 mm and 5 mm.

3. The device in accordance with claim 1, wherein the said thermocouple is made of a material pair chromel having the alloy name Ni 90 Cr 10 and alumel having the alloy name (Ni 95/Al+Mn+Si 5).

4. The device in accordance with claim 2, wherein the said thermocouple is made of a material pair chromel having the alloy name Ni 90 Cr 10 and alumel having the alloy name Ni 95/Al+Mn+Si 5).

5. The device in accordance with claim 2, wherein said thickness is about 50 μm and said length is 2.5 mm.

6. The device in accordance with claim 4, wherein said thickness is about 50 μm and said length is 2.5 mm.

7. The process for measuring the velocity of flow of a fluid, the process comprising:

provfiding a thermocouple with a junction point arranged in the fluid; heating the thermocouple with an a.c. power source to a working temperature that is increased compared with the fluid temperature, wherein the temperature coefficient of the ohmic resistance of said thermocouple is adapted to a temperature dependence of the heat conductivity of the fluid such that the heating power converted in said thermocouple in the case of a change in ambient fluid temperature and unchanged a.c. current varies by exactly the same amount as the amount of heat released to the fluid due to the changed heat conduction;

measuring the a.c. current to determine the flow.

8. A process in accordance with claim 7, further comprising:

determining a conductivity temperature coefficient of the fluid;

setting an ohmic temperature coefficient of said thermocouple to a value counteracting the conductivity temperature coefficient of the fluid in order to maintain said current through said thermocouple element substantially constant over varying ambient temperatures of the fluid.

9. A device for measuring a flow of a fluid where the fluid has a known heat conductivity with a conductivity temperature coefficient, the device comprising:

a heating element arrangeable in the fluid, said heating element having an ohmic resistance with an ohmic temperature coefficient;

an a.c. power source connected to said heating element and flowable of current through said heating element to heat said heating element to a working temperature higher than an ambient temperature of the fluid;

a thermocouple with a junction point in said heating element, said thermocouple generating a thermocouple voltage representative of said working temperature;

an evaluating circuit receiving said thermocouple voltage, said evaluating circuit varying said current through said heating element to maintain said working voltage above the ambient temperature by a substantially constant value, said ohmic temperature coefficient of said heating element having a value counteracting the conductivity temperature coefficient of the fluid in order to maintain said current through said heating element substantially constant over varying ambient temperatures of the fluid, said evaluation circuit measuring the current to determine the flow.

10. A device in accordance with claim 9, wherein:

said heating element includes a support post arrangeable in the fluid to have a post temperature substantially equal to said ambient temperature of the fluid;

said thermocouple measures said working temperature with respect to said post temperature.

* * * * *